United States Patent
Kim

(10) Patent No.: US 8,849,089 B2
(45) Date of Patent: Sep. 30, 2014

(54) MOTION PICTURE CREATION METHOD IN PORTABLE DEVICE AND RELATED TRANSMISSION METHOD

(75) Inventor: Hyun Sool Kim, Seoul (KR)

(73) Assignee: Samsung Electronics Co., Ltd (KR)

( * ) Notice: Subject to any disclaimer, the term of this patent is extended or adjusted under 35 U.S.C. 154(b) by 1543 days.

(21) Appl. No.: 11/870,224

(22) Filed: Oct. 10, 2007

(65) Prior Publication Data

US 2008/0085097 A1    Apr. 10, 2008

(30) Foreign Application Priority Data

Oct. 10, 2006  (KR) .......................... 10-2006-0098553

(51) Int. Cl.
*H04N 5/932* (2006.01)
*G11B 27/10* (2006.01)
*G11B 27/034* (2006.01)

(52) U.S. Cl.
CPC .............. *G11B 27/10* (2013.01); *G11B 27/034* (2013.01)
USPC ........... 386/201; 386/224; 386/235; 386/236; 386/237; 386/238

(58) Field of Classification Search
USPC ................................. 386/201, 224, 235–238
See application file for complete search history.

(56) References Cited

U.S. PATENT DOCUMENTS

| | | | | |
|---|---|---|---|---|
| 6,057,832 A * | 5/2000 | Lev et al. | ....................... | 715/720 |
| 6,111,709 A * | 8/2000 | Oliver et al. | ..................... | 360/39 |
| 7,106,949 B1 * | 9/2006 | Pieper | ............................ | 386/253 |
| 7,794,229 B2 * | 9/2010 | Nieminen et al. | ............. | 434/169 |
| 2002/0070960 A1 * | 6/2002 | Maine et al. | .................... | 345/723 |
| 2002/0199197 A1 * | 12/2002 | Winter et al. | .................... | 725/74 |
| 2003/0081936 A1 * | 5/2003 | Kim | ................... | 386/46 |
| 2005/0219382 A1 * | 10/2005 | Abe et al. | ................ | 348/231.99 |
| 2006/0257103 A1 * | 11/2006 | Lim et al. | ......................... | 386/95 |
| 2009/0144784 A1 * | 6/2009 | Li et al. | .......................... | 725/97 |

FOREIGN PATENT DOCUMENTS

| | | |
|---|---|---|
| KR | 1020020080594 | 10/2002 |
| KR | 1020030037614 | 5/2003 |
| KR | 1020040052301 | 6/2004 |
| KR | 102005006955 | 7/2005 |
| KR | 1020050077933 | 8/2005 |
| KR | 1020050108864 | 11/2005 |
| KR | 1020050116350 | 12/2005 |
| KR | 1020060083240 | 7/2006 |

* cited by examiner

*Primary Examiner* — Helen Shibru
(74) *Attorney, Agent, or Firm* — The Farrell Law Firm, P.C.

(57) ABSTRACT

Disclosed is a method of creating motion pictures in a portable device. The method includes detecting whether an event occurs while a stored motion picture file is being played, if an event occurs, extracting and playing a video stream of the motion picture file simultaneously after the occurrence, and creating a user motion picture file by producing a user audio stream and compounding the user audio stream with the extracted video stream. Further disclosed is a method of providing contents in a portable device. This method includes selecting a stored receiver's information, saving and playing simultaneously, if an event occurs, a video stream of the motion picture file after the occurrence, creating a customized audio stream according to the receiver's information and producing a user's motion picture file by compounding the audio stream with the video stream, attaching the user's motion picture file to a message, and transmitting the message.

7 Claims, 4 Drawing Sheets

MOTION PICTURE CREATION METHOD IN PORTABLE DEVICE AND RELATED TRANSMISSION METHOD

PRIORITY

This application claims priority under 35 U.S.C. §119(a) to Korean Patent Application No. 2006-98553, which was filed in the Korean Intellectual Property Office on Oct. 10, 2006, the contents of which are incorporated by reference herein in its entirety.

BACKGROUND OF THE INVENTION

1. Field of the Invention

The present invention relates generally to a portable device and, more particularly, to a method of editing a motion picture using a portable device and a related transmission method.

2. Description of the Related Art

As functions of a current portable device have been dramatically expanding, a user can now take images or video by using a camera function of the portable device. In addition, a user can send such images or video through a Multimedia Messaging Service (MMS). MMS is a standard for a telephony messaging system that allows sending messages that include multimedia objects (i.e., images, audio, video, rich text) and not just text as in a Short Message Service (SMS).

The transmission of image data through MMS requires complying with MMS transmission standards provided by existing telecommunication agencies. The standardized image data is transmitted to a Multimedia Messaging Service Center (MMSC), which is a specialized system for MMS. Then the MMSC sends the received image data to the counterpart device.

As User-Created Content (UCC) or User-Generated Content (UGC) has recently become popular, users may often want to create and share their own unique media contents, especially a motion picture, through the portable device. Also, some users may have a tendency to gain publicity by offering such contents to people. Nevertheless, a conventional portable device can only take a motion picture through a video camera or download a motion picture from another device or network. Therefore, there is a need for a method of editing a motion picture according to a user's intention.

SUMMARY OF THE INVENTION

In one aspect of the present invention, the above and other objects of the invention can be accomplished by a method of creating motion pictures in a portable device.

The method includes detecting whether an event occurs while a stored motion picture file is being played, extracting and playing the video stream of the motion picture file simultaneously after the event occurs if the event occurs, and creating a user motion picture file by producing a user audio stream and compounding the user audio stream with the extracted video stream.

In another aspect of the present invention, the above and other objects can be accomplished by a method of providing contents in a portable device.

The method includes selecting a stored receiver's information, saving and playing simultaneously, if an event occurs, a video stream of the motion picture file after the event occurs, creating a customized audio stream according to the receiver's information and producing a user's motion picture file by compounding the audio stream with the video stream, attaching the user's motion picture file to a message, and transmitting the message.

BRIEF DESCRIPTION OF THE DRAWINGS

The above and other objects, features, and advantages of the present invention will be more apparent from the following detailed description in conjunction with the accompanying drawings, in which.

DETAILED DESCRIPTION OF THE INVENTION

Exemplary, non-limiting embodiments of the present invention will now be described more fully hereinafter with reference to the accompanying drawings. This invention may, however, be embodied in many different forms and should not be construed as limited to the exemplary embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

In the following description, a 'audio' refers to an analog signal of voice or music. Also, a 'audio data' refers to a digital signal converted from audio. Additionally, a 'audio stream' refers to a sequence of encoded audio data. Similarly, a 'video' refers to an analog signal of picture or drawing, a 'video data' refers to a digital signal converted from video, and a 'video stream' refers to a sequence of encoded video data.

The audio stream and the video stream are continuous and coherent streaming data, and have starting and ending addresses. A 'motion picture file' refers to a file that includes a file header and a file body, the file header having the starting and ending addresses of the audio and video streams and information about decoding and encoding, and the file body having the audio and video streams. Moreover, a 'motion picture' refers to a digital signal before the motion picture file is encoded or after the motion picture file is decoded.

The present invention allows users to customize content through a function to edit the audio stream in motion pictures. To achieve this function, although audio data and video data are encoded in different signal bit rates, the starting address of the file header between audio data and video data are synchronized when a motion picture is played.

Figure 1:
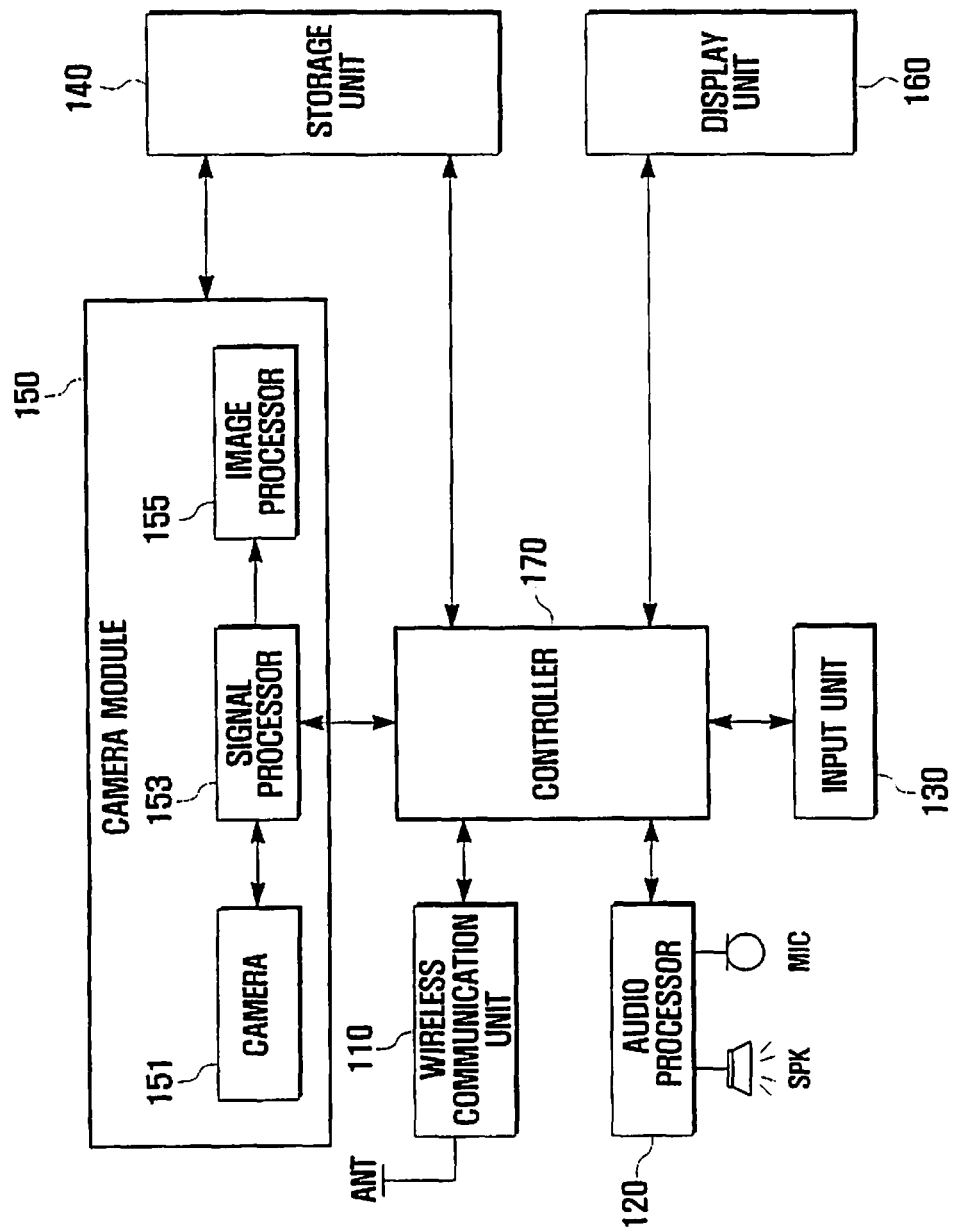
FIG. 1 is a block diagram illustrating a configuration of a portable device in accordance with an exemplary embodiment of the present invention.

Referring to FIG. 1, the portable device includes a wireless communication unit 110, an audio processor 120, an input unit 130, a storage unit 140, a camera module 150, a display unit 160, and a controller 170. The wireless communication unit 110 transmits and receives data such as a message or an MMS message to and from other portable devices via wireless communication. Furthermore, the wireless communication unit 110 executes communications for receiving and sending contents, while interacting with external content servers. The wireless communication unit 110 includes a Radio Frequency (RF) transmitter that up-converts and amplifies the frequency of a signal being transmitted, and an RF receiver that low-noise amplifies a signal being received and down-converts its frequency.

The audio processor 120 plays an audio data outputted from the controller 170 and transmits an analog audio signal such as voice received through a MICrophone (MIC) to the controller 170. The transmission is processed via a converter. To be specific, the audio processor 120 converts a digital audio signal fed into the controller 170 to an analog signal and plays back the analog signal such as audio through a SPeaKer (SPK). The audio processor 120 also receives an audio such as voice or sound (in the form of analog signal) from MIC and converts into an audio data (in the form of a digital signal).

The input unit 130 includes multiple input keys and function keys to control various functions received by numeric and character information. The function keys include directional arrow keys, side keys and shortcut keys to process a specific function. The input unit 130 receives a manipulated signal for controlling the portable device to transmit the signal to the controller 170. The input unit 130 of present invention further includes keys for creating and editing a user's motion pictures.

The storage unit 140 includes an application for controlling functions; motion picture files created by the user and downloaded contents such as motion picture files. The storage unit 140 can include more than one buffer to temporarily save the user's data generated while executing the application programs.

The storage unit 140 includes a program memory for storing an Operating System (OS), programs for messages and remaining functions in a portable device, such as a camera function, a play function for audio, images or motion pictures; and a data memory for storing data generated by usage of a portable device and various contents, such as still or motion picture images, audio streams like music and a sound source, and a user's phone book. The functions will be provided via applicable programs under the control of the controller 170, if the user requests to activate the above functions.

The camera module 150 includes a camera 151, a signal processor 153, and an image processor 155 to support camera function in a portable device. The camera 151 takes an image data and the camera sensor converts the resulting optical signal to an electrical signal. The camera sensor may be a Charge-Coupled Device (CCD) sensor. The signal processor 153 converts an analog image output from the camera 151 to digital image signal. The image includes still or motion pictures. Preferably, the signal processor 153 may be realized in a Digital Signal Processor (DSP). The image processor 155 outputs an image data obtained by an image signal received from the signal processor 153. The image processor 155 transmits the image to meet a standard of the display unit 160 and compresses the image data or decompresses the compressed image data into original image data according to the controller 170.

The display unit 160 displays image data output from the image processor 155. The display unit 160 visualizes a manual, user manipulating data, function set-up information and other information to the users of the portable device. The display unit displays the motion pictures. The display unit 160 may be a Liquid Crystal Display (LCD). In this case, the display unit 160 includes an LCD controller, a buffer to save the motion pictures temporarily, a memory for storing image data, and an LCD display element. When the LCD is implemented using a touch screen technology, the screen of the display unit 160 may function as the input unit 130, either fully or partially. Especially, when the display unit 160 executes a camera function, it may act like an eye lens in a general camera to display a subject.

The controller 170 performs the overall control operation and internal flow of signals between an input unit 130, a storage unit 140, a camera module 150, and a display unit 160 on a portable device. The controller 170 may include a data processing module consisting of a Coder/DECoder (CODEC) and a Modulator/DEModulator (MODEM) (not shown). The CODEC encodes a transmitted signal and decodes a received encoding signal. The MODEM modulates a transmitted encoding signal and demodulates a received modulated signal from the wireless communication unit 110. A data processing module may include a VOice enCODER (VOCODER) encoding or demodulating audio data. A data processing module can be a part of the wireless communication unit 110 or a constituent between the wireless communication unit 110 and the controller 170.

In order to create the motion pictures, the controller 170 can run application programs such as decoding or encoding of a video or an audio stream. The video stream is synchronized and encoded by an event (key input). All or partial application programs for creating a user's motion pictures can be realized in a CODEC or an equivalent of the controller 170. Especially, a data processing module can encode or decode an audio data through a VOCODER, which is an audio CODEC. The method of encoding or decoding audio data can be an Enhanced Variable Rate CODEC (EVRC) method, a QualComm Excited Code Linear Prediction (QCELP) method, an Adaptive Multi-Rate (AMR) method, an Advanced Audio Coding (MC) method, or a Moving Picture Experts Groups (MPEG) 1 Audio Layer 3 (MP3) method.

Figure 2:
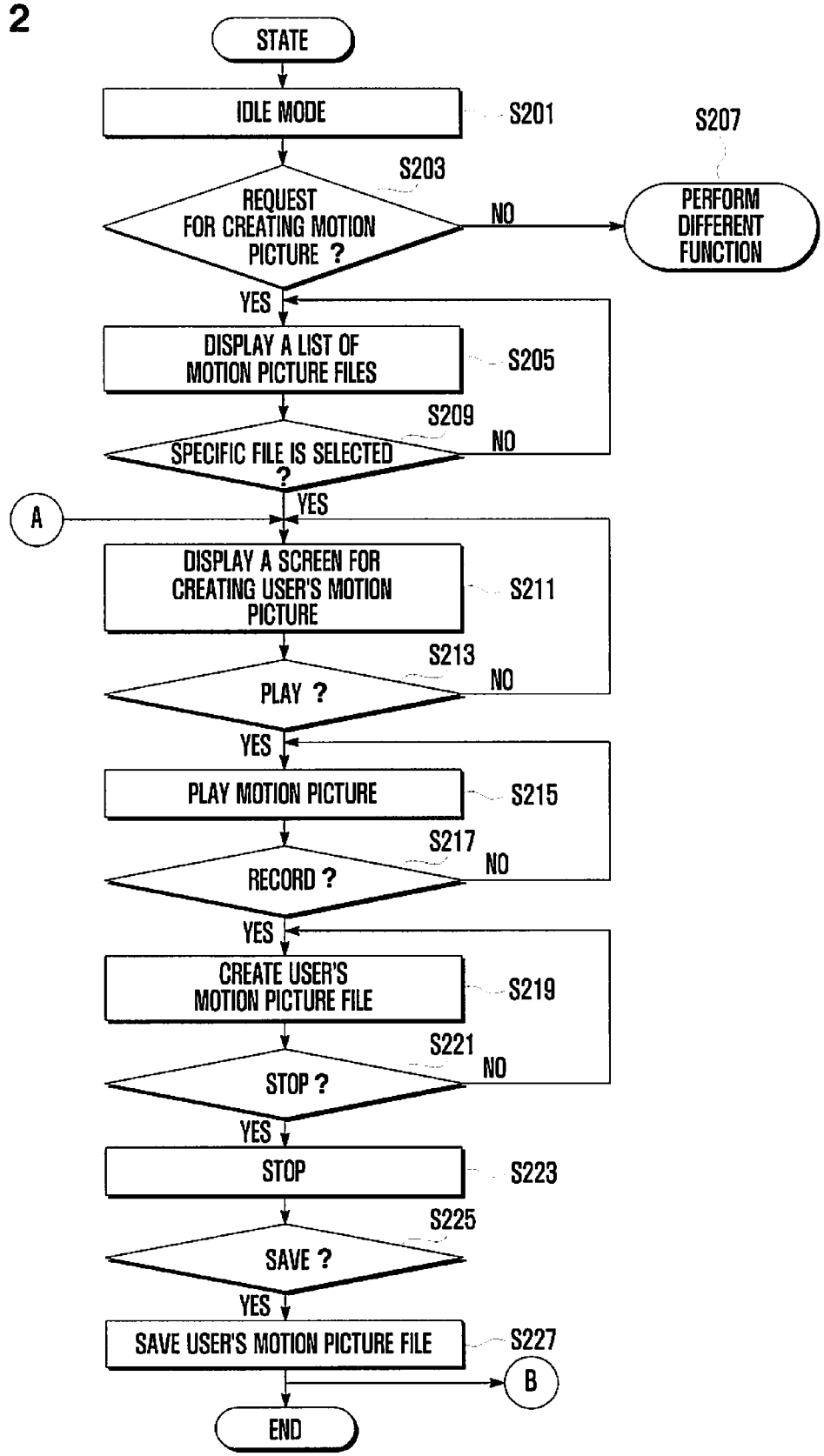
FIG. 2 is a flow diagram illustrating a method of creating a motion picture in a portable device in accordance with an exemplary embodiment of the present invention.

A method of creating new motion pictures using the above-discussed portable device will now be described. Referring to FIG. 2, in the state in which the portable device is in an IDLE mode, in step S201, if a key input that is a function of creating moving pictures occurs, the controller 170 detects, in step S203, and displays a list of motion pictures through the display unit 160, in step S205.

If the key input represents another function, in step S203, the controller 170 performs a different function, in step S207.

Figure 3A:
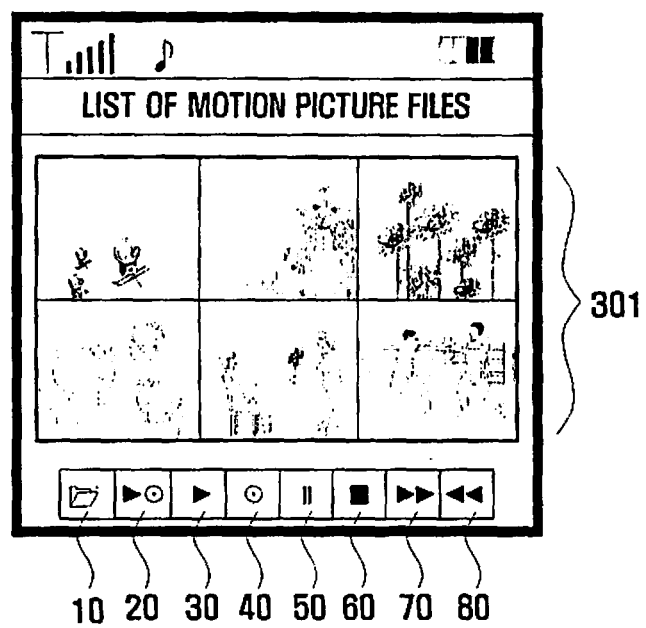
FIGS. 3A and 3B are example screen views showing a method of creating a motion picture in a portable device in accordance with an exemplary embodiment of the present invention.
Figure 3B:
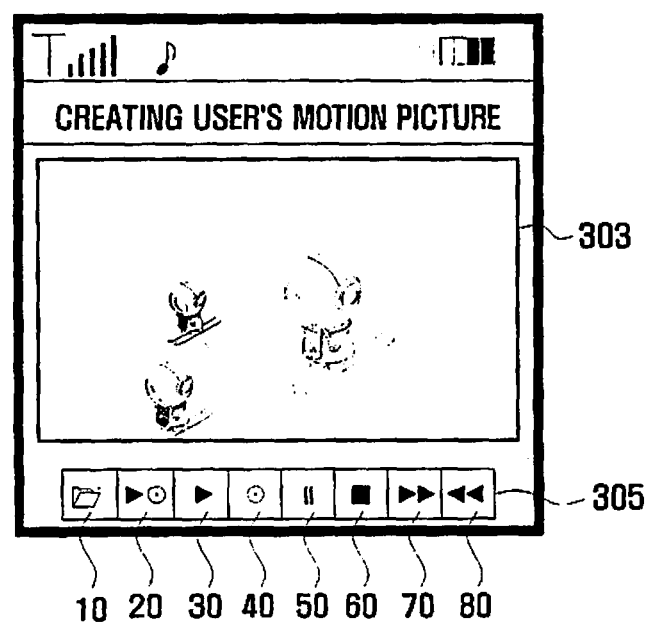

Preferably, the list of motion pictures, as illustrated in FIG. 3A, has at least one stored motion picture file. The list of motion pictures is displayed in a stored thumbnail 301, saved separately by down scaling the first frame of motion picture files. The motion pictures can be saved in various file formats such as Audio Video Interleaving (AVI), Motion Picture Experts Group 4 file format (MP4), [H.264], etc. If a user selects one of the files from the list of motion pictures by a key input, the controller 170 detects, in step S209 and displays a screen for creating a user's motion picture through the display unit 170, as illustrated in FIG. 3B, in step S211.

The screen for creating user's motion picture includes a preview screen 303 and an interface of editing motion pictures 305.

The preview screen 303 displays a first frame of selected motion picture through the display unit 160. In order to achieve this, the controller 170 fetches a stream of the selected motion picture to the storage unit 140, and displays the first frame of the motion picture file through the display unit 160 after decoding it.

The interface of editing motion pictures 305 has functions of play, record, stop, pause, and load.

The controller 170 determines whether the key input represents a request of 'play', in step S213 and plays the motion pictures through the display unit 170, in step S215.

The controller 170 decodes both a video stream and an audio stream according to the header information received from the motion picture (hereinafter 'original motion picture') in the storage unit 140 and plays the motion picture file through the display unit 160 after synchronization of the video stream and the audio stream with the starting address. The information saved in the header includes the method of encoding/decoding and the starting address for synchronization.

The user can select an analog signal such as sound source and voice that the user wants to record while watching the motion picture through the display unit 160. If the user selects 'record' in the interface of editing motion pictures 305, the controller 170 detects this user input, in step S217 and creates a user's motion picture file, in step S219.

At S219, the controller 170 plays the video stream of the original motion picture, saves the video stream simultaneously. During this event, an audio stream of the original motion picture file is not played.

In order to create the user's motion picture file, at the moment of the 'record' key input, the encoded audio stream of audio data is synchronized with the starting address of the video stream.

To explain in detail, the controller 170 displays the decoded video stream of the motion pictures through the display unit 160 when the user inputs the 'record' key while saving the video stream separately before the video stream was decoded. At the same time, when an analog signal, such as voice or another sound source is input from the MIC, the audio processor 120 converts the analog signal into a digital signal and outputs the digital audio data to the controller 170. Then, the controller 170 receives the output audio data and encodes the received data into the audio stream. The audio steam is encoded after synchronization with the video stream. The user can replace the original motion picture file with the user's motion picture file through the process as described above, i.e., the audio stream of the original motion picture file can be replaced by audio data such as voice input by the user.

The process to synchronize the user's motion picture file, as described above, can be implemented by saving the starting address of the video stream, copied from the moment the user selects record key, and by synchronizing the audio stream with the starting address of the video stream, i.e., when the user's motion picture file is played, the respective starting addresses of the audio stream and video stream are saved in order to play them at the same position. The starting address may be saved in a header of the user's motion picture file.

Apart from the above synchronization process, the user can input voice at any time while watching the motion picture through the display unit 160 and have a dubbing like effect. If there is no other input from the MIC after selecting the 'record' key, a surrounding noise would be input although a usual surrounding noise under a certain level is not input in practice and the audio stream of the original motion picture would not be played as well. Thus, if the user inputs the user's voice (audio) through the MIC while watching the playing video data, the audio input by the user through the MIC and the video screen at the moment audio was input can be synchronized. This dubbing effect can be realized by synchronizing the starting address of the video stream and audio stream. The present invention includes the function of playing and recording simultaneously through the interface of editing motion pictures (305) although the playing procedure and the recording procedure are described separately at steps S213 to S219.

The controller 170 detects the key input representing a 'stop' request, in step S221, and stops creating the user's motion picture file, in step S223. The controller 170 temporarily saves the video/audio stream produced in the step 219 and the starting and ending addresses of the video/audio stream.

Next, if a key input occurs from the user, the controller 170 detects whether the key input represents a request for saving the user's motion picture file, in step S225, and saves the user's motion picture file in the storage unit 140, in step S227. The controller 170 saves the starting and ending address of the video/audio stream for synchronization, and the method of encoding and decoding in the header of user's motion picture file. The video stream and audio stream is saved in the body of the user's motion picture file.

The present invention includes the interface of editing motion pictures 303 for creating and editing user's motion pictures although only 'play', 'record' and 'stop' keys are explained in the above-described process in order to state the creation process of user's motion picture file explicitly.

Referring to FIG. 3B, as described above, the controller produces the screen for creating the user's motion picture through the display unit 160, and the screen includes the preview screen 303 and the interface of editing motion pictures 305.

The controller 170 searches for the storage unit 140 and displays the list of motion pictures, if there is a key input of 'LOAD (10)', as shown in FIG. 3A. When customer selects one of the motion picture file from the list, the controller 170 displays the first frame of the selected motion picture file through the preview screen, as shown in FIG. 3B.

T, If the key input represents 'PLAY AND RECORD (20)', the controller 170 plays the motion picture file simultaneously with creating the user's motion pictures file.

If there is a 'PLAY (30)' key input, the controller 170 decodes the audio/video stream of the original motion picture file and plays through the display unit 160.

If there is a 'RECORD (40)' key input, the user's motion picture file is created by synchronizing the video stream with the input audio stream of the motion picture file.

The video stream of an original motion picture file is saved separately while decoding and displaying through the display unit 160, and the audio stream of the original motion picture file is not decoded. The starting address of the video stream at the moment the record key was input is temporarily saved. The audio data from the audio processor 120 is synchronized with the starting address of the video stream, i.e., the audio stream is created in synchronization with the vide stream.

If there is a key input of 'PAUSE (50)', the controller 170 makes a pause the process of 'PLAY (30)' or 'RECORD (40)' and temporarily saves the ending address of the video and audio stream. The motion picture file will be played subsequent to the stored ending address if there is a key input of 'play' or 'record' again.

If there is key input of 'STOP (60)', the above process of 'PLAY (30)' or 'RECORD (40)' is terminated, i.e., the process to decode the video stream of the motion picture or to create the user's motion picture file is terminated. The ending and starting address of the video and audio data will be stored temporarily.

The controller 170 scans the succeeding part of the motion picture, if there is a key input of 'FAST FORWARD (70)'.

The controller 170 scans the preceding part of the motion picture, if there is a key input of 'REWIND (80)'.

The above explanation only describes the creation of the user's motion picture file with the stored motion picture file in the storage unit 140 to show that the present invention can create the user's motion picture file without the camera module 150 as an exemplary embodiment of the present invention. However, the present invention also can create the user's motion picture with the stored motion picture file, which is taken from the camera module 150, in storage unit 140. Further, a motion picture from the digital broadcasting can be saved and used for creating the user's motion picture file.

Figure 4:
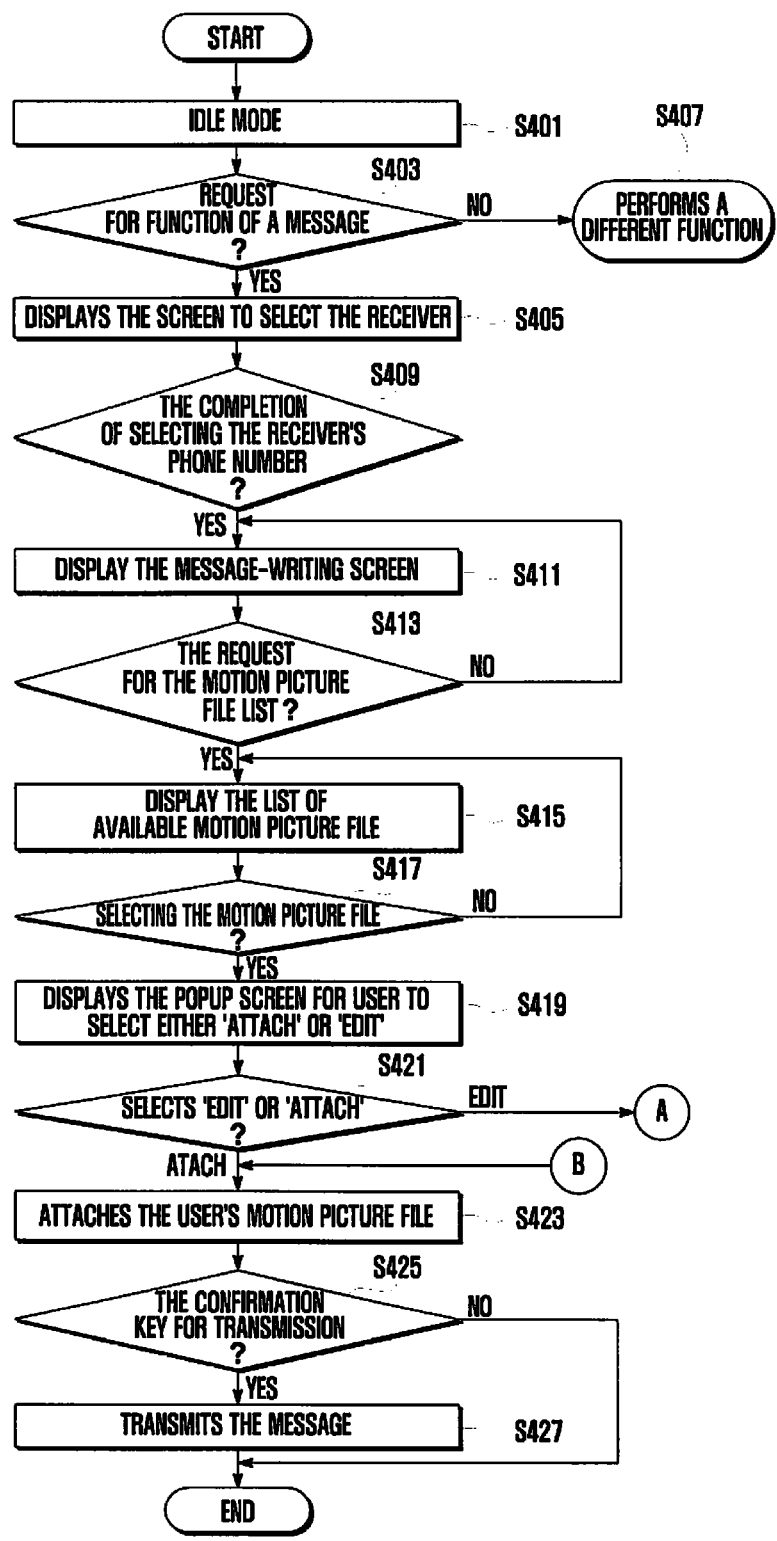
FIG. 4 is a flow diagram illustrating a method of transmitting a created motion picture file with a message in accordance with another exemplary embodiment of the present invention.

Multiple contents with different audio streams can be created with one original motion picture file with the present invention, as described above. The user's motion pictures having the different audio stream contents can be transmitted to a large number of people. A method of transmitting the user's motion picture data, created by the above-described method, along with a multimedia message (hereinafter, 'MMS message') is as follows. FIG. 4 is a flow diagram illustrating a method of transmitting a created motion picture file with a message in accordance with another exemplary embodiment of the present invention.

Referring to FIG. 4, a portable device performs an idle mode, in step S401.

The controller 170 detects whether the key input represents a request for a message function, in step S403.

If the key input represents a request for a message function, the controller 170 displays the screen to select a receiver's phone number through the display unit 160 after reading phone-book data from the storage unit 150, in step S405. Then, the user can select the receiver's phone number. If there is the key input representing the different function, the controller 170 performs a different function, in step S407.

The controller 170 detects whether there is the key input representing the completion of selecting the receiver's phone number, in step S409.

If there is the key input representing the completion of selecting the receiver's phone number, the controller 170 saves the receiver's phone number in the temporary storage, and the controller 170 displays a message-writing screen through the display unit 160, in Step S411.

Next, the user can input a message in the message-writing screen. When user completes a message input and inputs the key representing the request for the motion picture file list, the controller 170 detects this key input, in step S413, and displays a list of available motion picture files to be attached, through the display unit 160, in step S415.

It is desirable to display the list of motion pictures using stored thumbnails, which are downscale-converted first frames of the video data in motion picture files, with each frame linked to a corresponding motion picture file. If a thumbnail is selected, a corresponding linked motion picture file will be loaded.

If the user inputs the key for selecting the motion picture file from the list of available motion picture files to be attached, the controller 170 detects this key input, in step S417, and displays the popup screen for user to select either 'attach' or 'edit' the selected motion picture file, in step S419.

If the user selects 'edit' in the above step S419, the controller 170 detects this key ('edit') input, in step S421, and creates a user's motion picture file through the step S211 and S227 in FIG. 2, and attaches the user's motion picture file to the message, in step S423.

The user can create a user's motion picture file having a different customized audio stream for the receivers. This method to create and transmit customized contents for the receivers after attaching the customized contents in the messages allows a portable device to be utilized more efficiently.

If the user selects 'attach' in a popup screen in the above step S413, the controller 170 detects this key ('attach') input, in step S421, and attaches the selected motion picture file at step S423 to the message.

Next, if the user inputs the confirmation key for transmission, the controller 170 detects this key input, in step S425, and transmits a message having the user's motion picture file or the selected motion picture file, in step S427.

The above description, where the user selects the receiver first and then creates the user's motion picture file, is to explain that the present invention allows user to create various customized contents for the receivers. The method of the present invention is not restricted to MMS messages. The customized contents can be created by various additional functions, i.e. Bluetooth®, etc., and transmitted to another party with the present invention. The user also can upload their motion picture to Internet and share with other people.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of creating motion pictures in a portable device, said method comprising:
    playing a motion picture file on the portable device by simultaneously playing a video stream and an audio stream of the motion picture file;
    detecting, by the portable device, a record command input by a user while the motion picture file is played on the portable device;
    in response to detecting the input record command, simultaneously extracting and playing, from among the video stream and the audio stream of the motion picture file, only the video stream of the motion picture file, while further simultaneously receiving audio input to create a user audio stream from the received audio input; and
    encoding the user audio stream created from the received audio input with the simultaneously extracted video stream to create a user motion picture file.

2. The method of claim 1, wherein extracting the video stream of the motion picture file includes copying and saving the video stream prior to decoding, and saving a starting address of the video stream.

3. The method of claim 1, wherein receiving the audio input further comprises converting the received audio input to audio data, creating an audio stream after encoding the audio data, and saving the audio stream after synchronizing the audio stream with a starting address of the video stream.

4. The method of claim 1, wherein an occurrence of the record command is simultaneous with the playing of the motion picture file.

5. The method of claim 1, wherein the user's motion picture file includes a file header and a file body, the file header having starting and ending addresses of the audio and video streams and information about decoding and encoding the audio and video streams, and the file body having the audio and video streams.

6. The method of claim 1, wherein the motion picture file was been previously downloaded and saved in a storage unit.

7. The method of claim 1, wherein data of the stored motion picture file is captured using a camera function in the portable device and saved in a storage unit.

* * * * *